United States Patent [19]

Lipschutz

[11] Patent Number: 5,224,483
[45] Date of Patent: Jul. 6, 1993

[54] ADAPTIVE CONTRAST ENHANCEMENT FOR SCANNED ULTRASONIC IMAGE

[75] Inventor: David Lipschutz, Lexington, Mass.
[73] Assignee: Hewlett-Packard Company, Palo Alto, Calif.
[21] Appl. No.: 885,582
[22] Filed: May 19, 1992
[51] Int. Cl.$^5$ .............................................. A61B 8/00
[52] U.S. Cl. .......................... 128/662.02; 128/661.04; 128/661.10; 128/660.04
[58] Field of Search ..................... 128/660.01, 660.04, 128/660.05, 661.04, 662.02, 661.10

[56] References Cited

U.S. PATENT DOCUMENTS

| | | | |
|---|---|---|---|
| 4,771,470 | 9/1988 | Geiser et al. | 128/661.04 |
| 4,865,040 | 9/1989 | Ogasawara | 128/661.04 |
| 5,097,836 | 3/1992 | Yamada et al. | 128/661.04 |
| 5,105,813 | 4/1992 | Shikata | 128/660.05 |

Primary Examiner—Kyle L. Howell
Assistant Examiner—George Manuel

[57] ABSTRACT

A method and apparatus for adaptively enhancing a scanned ultrasound image of a body portion having both areas of tissue and areas of blood pool. Clutter which appears in the blood pool areas is removed by processing the image signal to generate a mask signal, which signal is substantially present in areas of tissue to pass such areas and is substantially not present in areas of blood pool to block such areas. The image signal is modulasted with the mask signal, preferably on a pixel-by-pixel basis, to substantially remove the clutter.

14 Claims, 4 Drawing Sheets

ADAPTIVE CONTRAST ENHANCEMENT FOR SCANNED ULTRASONIC IMAGE

FIELD OF THE INVENTION

This invention relates to ultrasonic imaging systems and more particularly to a method and apparatus for enhancing contrast in such a system by suppressing clutter in non-tissue areas of the image.

BACKGROUND OF THE INVENTION

Ultrasound images of various parts of the body, and in particular cardiac ultrasound images, may contain pools of blood in, for example, arteries or cardiac chambers, which blood pools are surrounded by tissue. Such images are frequently degraded by the presence of "clutter" which can be defined as extraneous image echoes displayed in blood pool areas. The presence of such clutter effectively lowers the contrast between blood and tissue, making it harder to find true physical tissue boundaries.

There are many causes of clutter, some of which can be addressed by the design of the system. However, there are also many patient-dependent factors involved in clutter, resulting in very different clutter levels from one patient to the next, these patient-dependent factors being poorly understood, and, therefore, difficult to eliminate.

At present, to the extent the clutter problem is dealt with at all in ultrasound imaging systems, an attempt is made to process the raw or received image in order to reduce the apparent clutter. This processing usually takes the form of a non-linear intensity mapping function which suppresses or rejects low level echoes, the assumption being that echoes resulting from clutter will be at a lower level than echoes resulting from tissue. However, this is not necessarily a valid assumption. Although a properly set threshold level for such non-linear intensity mapping will reduce or eliminate clutter, it will also degrade the presentation of tissue, since the speckle pattern making up tissue contains many echoes at or below the intensity of the clutter, even though the average intensity of the tissue is generally higher. Therefore, such reject processing is not particularly effective in increasing the contrast between blood and tissue.

A need, therefore, exists for an improved method and apparatus for suppressing clutter in an ultrasound image of a body portion containing both blood pool areas and tissue areas, without any significant degradation in the tissue portion of such image.

SUMMARY OF THE INVENTION

In accordance with the above, this invention provides a method and apparatus for adaptively enhancing a scanned ultrasound image signal of a body portion having both areas of tissue and areas of blood pool. Clutter may appear in the blood pool areas. In accordance with the invention, the image signal is processed to generate a mask signal having substantially a first value in areas of tissue and having substantially a second different value in areas of blood pool. The image signal is then modulated with the mask signal to substantially remove the clutter. The image is preferably formed of an XY matrix of pixels, and the modulating is preferably done on a pixel-by-pixel basis.

The processing of the image to Generate the mask involves passing the image signal through at least one low pass filter stage, with the output from each low pass filter stage being operated upon by a non-linear function. Each filter stage is preferably a two-dimensional filter stage, with a separate X filter stage and a separate Y filter stage being provided for the preferred embodiment. The non-linear processing for each stage preferably includes a normalization circuit followed by a table look up circuit. There are preferably a plurality of filter stages with the non-linear function utilized in the non-linear function circuit for each succeeding stage being steeper (i.e., having a threshhold characteristic with a steeper slope) than the function for the preceding stage.

The foregoing and other objects, features and advantages of the invention will be apparent from the following more particular description of a preferred embodiment of the invention as illustrated in the accompanying drawings.

IN THE DRAWINGS

DETAILED DESCRIPTION

An ultrasound image is produced by generating a plurality of successive ultrasonic signals at different angles which are projected into the patient, recording the echoes received on each such signal and processing echoes to obtain a desired image. The image signal may then be scan converted to an X-Y pixel display format, polar coordinate display format or other display format suitable for presentation on a standard cathode ray tube monitor. While, for purposes of the following discussion, an X-Y display format is assumed, other display formats may be utilized with appropriate changes in circuitry.

Figure 1:
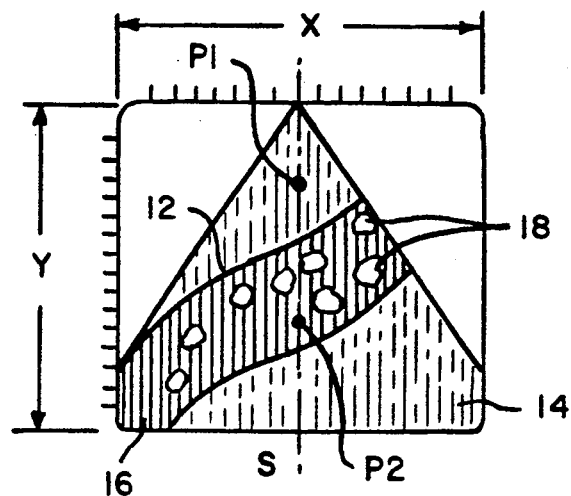
FIG. 1 is an illustration of an exemplary unprocessed image containing clutter in a blood pool area.

An example of such image is shown in FIG. 1 for a body portion producing a speckle pattern in tissue areas 12 and 14 and having a blood pool area 16, for example an artery, in which there is a certain amount of clutter. The clutter is represented by the extraneous images 18 appearing in area 16. Since images of the tissue have a speckle pattern, and the clutter in blood pool area 16 can also provide a speckle appearance, it may be difficult in some situations to clearly distinguish between blood and tissue in border areas. However, since one objective of an ultrasonic scan may be to detect abnormalities in heart chambers or arteries, any loss of contrast at tissue boundaries may impede the ability of the physician to adequately detect such abnormalities. Therefore, it is desirable that an improved technique be provided for eliminating clutter 18 and for thus enhancing the contrast between blood pool area 16 and adjacent tissue areas 12 and 14.

For reasons previously discussed, a straight thresholding to eliminate clutter causes sufficient degradation of tissue signal so as to be of little if any benefit in contrast enhancement. It is, therefore, preferable that a technique be provided for suppressing clutter 18 without also suppressing images in tissue areas 12 and 14.

Figure 2:
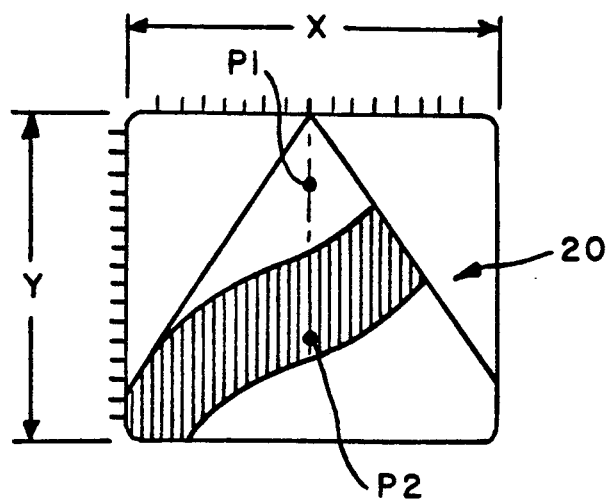
FIG. 2 is an illustration of a suitable mask obtained in accordance with the teachings of this invention to modulate out the clutter in the image of FIG. 1.

One way in which this might be accomplished is to generate a mask 20 (FIG. 2) which has no effect on the image in tissue areas 12 and 14, while causing full suppression in blood pool area 16. This mask, which is adaptive to the image scanned, may then be mixed with the scanned image to achieve the desired selective suppression of clutter without also causing tissue degradation as with existing systems. In particular, the mask image is one in tissue areas to be saved and is zero in blood pool areas to be blocked.

Figure 3:
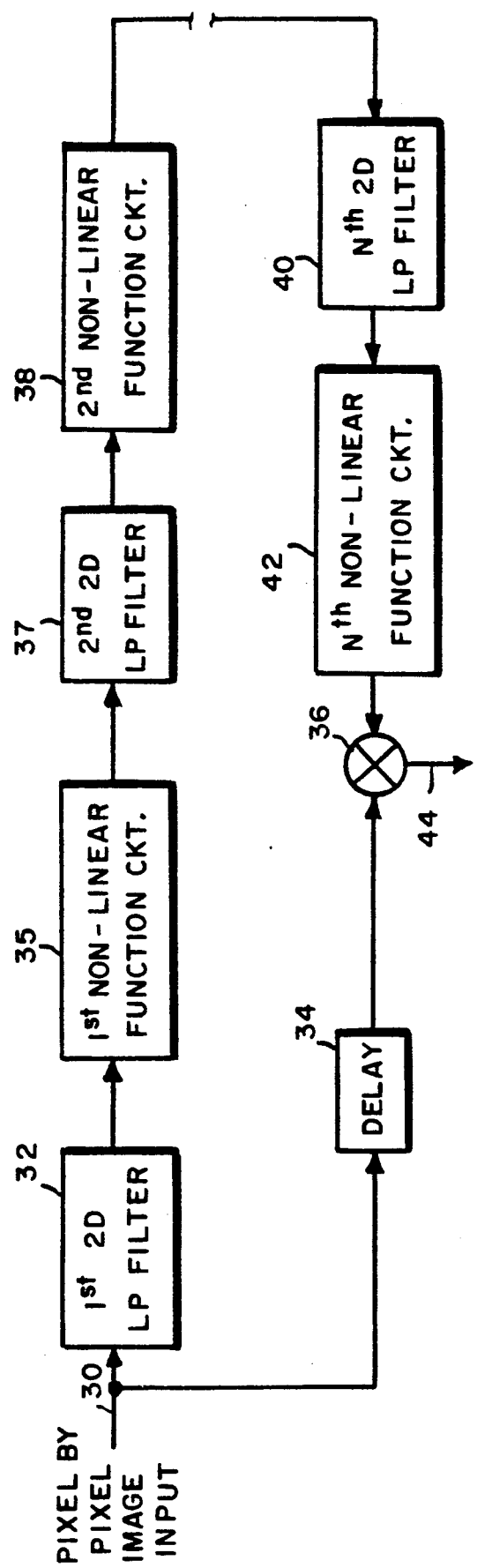
FIG. 3 is a schematic block diagram of an N stage circuit for a preferred embodiment of the invention.

FIG. 3 is a generalized block diagram of a circuit adapted for generating the desired mask 20 and for mixing the mask with the image signal to achieve the desired clutter suppression. The circuit of FIG. 3 would be inserted in the system between the scan conversion circuitry and the display so that the inputs on line 30 are a pixel-by-pixel representation of the image to be displayed. For purposes of this invention, it will be assumed that the inputs on line 30 represent pixels starting in the upper left-hand corner of the image shown in FIG. 1 and proceeding for successive X positions in the right-hand direction. Assuming, for example, a display of 624 pixels by 624 pixels, pixels 0 through 623 would be for a value Y=0; pixels 624–1247 would be for line Y=1; etc. For each pixel, there would be N bits which may be indicative of a particular gray scale value or color. In blood pool areas 16, without clutter 18, the image will be substantially solid black for gray scale presentations or a solid selected other color for color images.

Pixels on line 30 are applied both to a first two-dimensional low-pass filter 32 and to a compensating delay circuit 34. Filter 32 is the first element of the mask generating circuitry. Delay 34 is to compensate for processing delays in the mask generating circuitry so that the mask value for a given pixel will arrive at a modulation mixer 36 at the same time as the image signal on line 30.

Low-pass filter 32 is preferably a box car integrator or finite impulse response (FIR) filter, the output of which is an average of N successive inputs. Such circuits are also referred to as convolution circuits.

While, ideally, it is desirable to provide a two dimensional filter with an impulse response having circular symmetry, this would be a complicated procedure. Therefore, this response is approximated by performing separate two-dimensional integration in the X and Y directions.

The effect of the integration or filtering is to somewhat blur boundaries. Thus, assuming the signal on line 30 had an appearance such as that shown on line A of FIG. 5, which is a signal for a scan line such as line S in FIG. 1, with 0 being black and 1 being white. Successive pixels on a given line represent tissue which would have some speckle pattern which would have a certain gray level. Pixel P1 in FIG. 1 is an example of such a pixel. These pixels appear on the left and right on line A of FIG. 5. The dark blood pool shown in the center of this line has a substantially zero value, with clutter in the blood pool causing discrepancies in the blood pool level, some of which have a gray scale which is indistinguishable from that of the tissue. However, since the tissue areas are connected while the clutter in the blood pool is disconnected, the clutter basically forming islands of speckle in the dark blood pool, the average intensity in areas with clutter is substantially less than the average intensity in areas with tissue. Therefore, the output from low pass filter or integrator 32, which is an average signal smoothing out the sharp edges on line A, more clearly illustrates the distinction between clutter and tissue. Line B of FIG. 5 illustrates an exemplary filter output for the signal on line A.

The output from filter 32 is applied to a first non-linear function circuit 35, which preferably has a power law, sigmoid-shaped curve or other curve with a generally gentle slope between accept and reject values. In other words, non-linear circuit 35 would provide a soft threshold. As shown on line C of FIG. 5, the output from this first non-linear function circuit may have dropouts therein rather than the deeper, wider and more randomly shaped depressions caused by clutter in the original image (line A).

While the output from circuit 35 may be utilized as the mask signal, it is preferable that this signal be passed through a second two-d low-pass filter 37 and a second non-linear function circuit 38. Filter 37 averages out the dropouts, as shown for example on line D of FIG. 5, and non-linear function circuit 38, which preferably has a sharper threshold than circuit 35, might then provide an output such as that shown on line E. The signal on line E might function as the desired mask signal. It is noted that the mask signal on line E for the preferred embodiment is not strictly binary, but contains some intermediate levels to provide a smooth transition between masked and unmasked regions, so as to prevent an unnatural appearance of the final image. However, the mask is still sharp enough to provide significantly enhanced contrasts between these regions.

Figure 4:
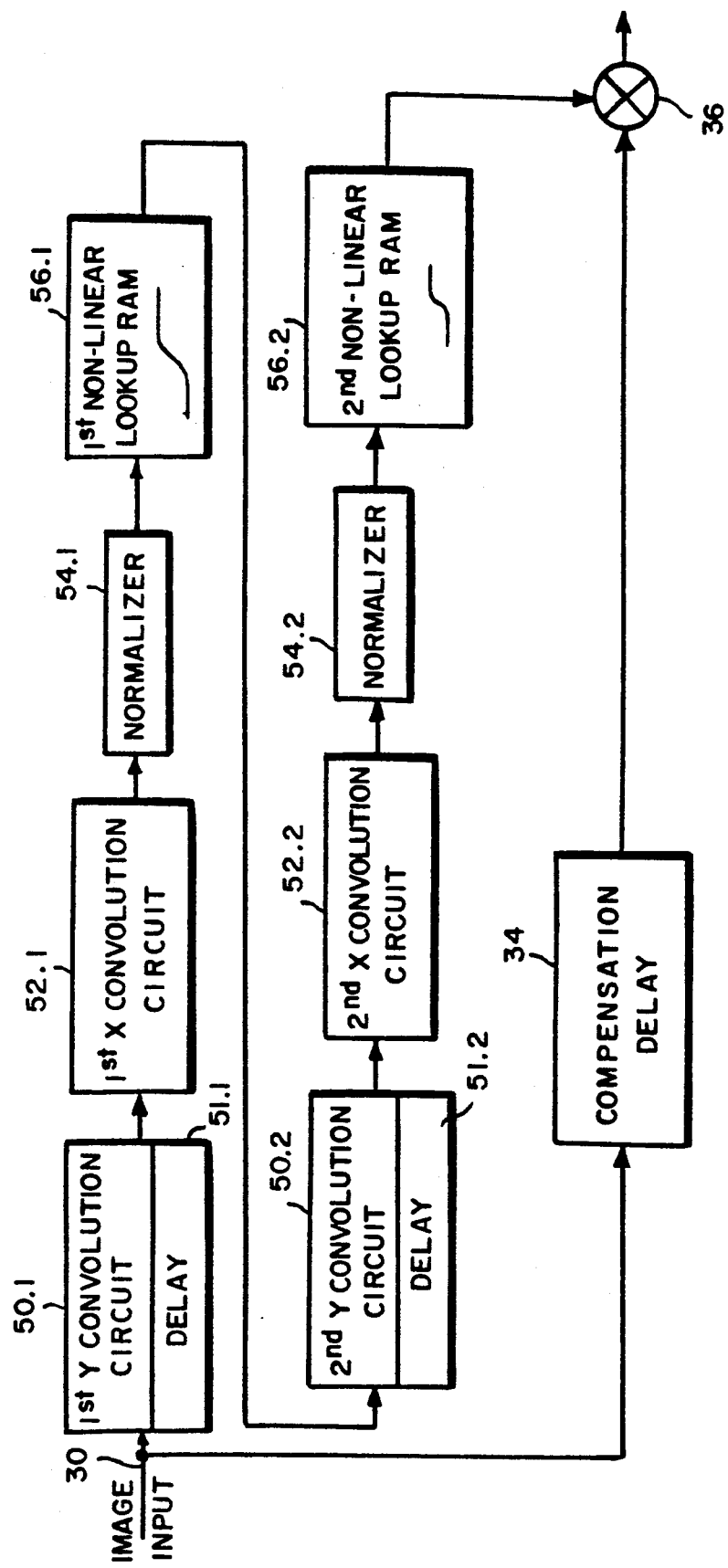
FIG. 4 is a more detailed schematic block diagram of a two-stage circuit in accordance with the teachings of this invention.
Figure 5:
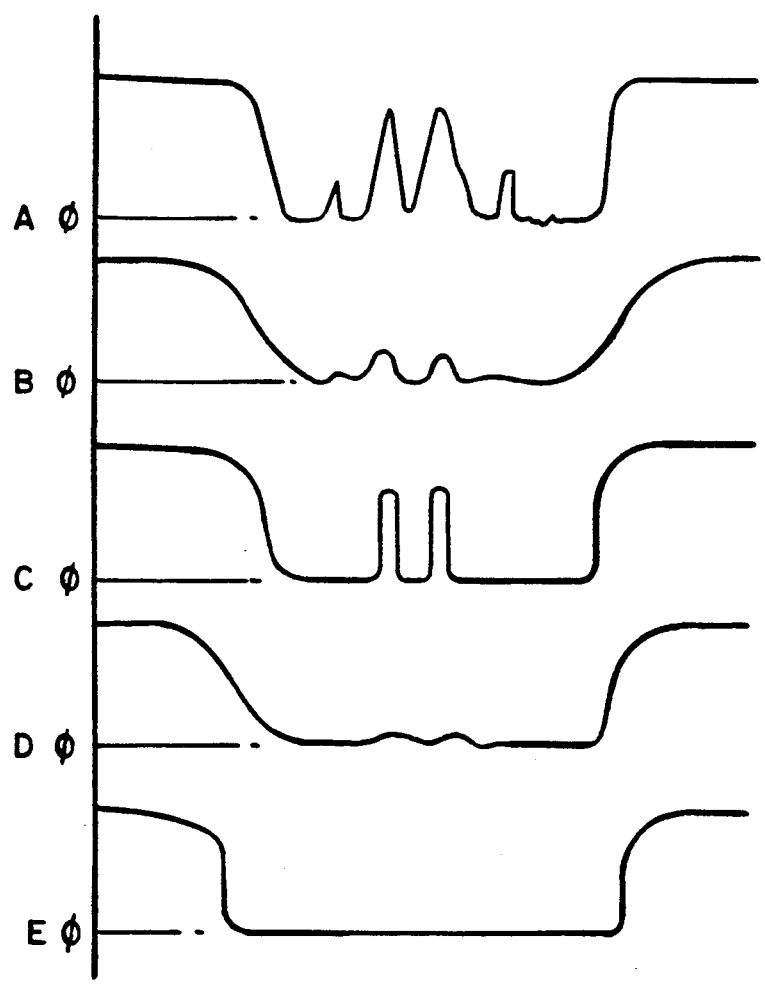
FIG. 5 illustrates exemplary waveforms appearing at various points in the circuits of FIGS. 3 and 4.

While FIG. 5 shows the mask being formed in two stages which, as will be discussed in conjunction with FIG. 4, is true for the preferred embodiment, it is possible that additional stages may be required in order to achieve a desired mask such as that shown on line E of FIG. 5 for certain applications. Therefore, FIG. 3 indicates the possibility of additional filter stages such as an Nth two-d low-pass filter stage 40 and a corresponding Nth non-linear function circuit 42. When a polar coordinate or other non-X-Y display format is utilized, two-dimensional convolution filters for such coordinate space would be employed as the filters 21, 35 and 40.

The output from the Nth non-linear function circuit is connected as the other input to mixer or modulation circuit 36, delay 34 being sufficient such that, for a given pixel, the pixel image and the mask value for the pixel arrive simultaneously. The output from circuit 36 is connected over line 44 to either additional processing circuitry or to the image forming circuitry of the ultrasonic scanning system in which the circuit is utilized.

FIG. 4 is a more detailed circuit diagram for a preferred embodiment of the invention, having two stages in the mask forming leg. In this circuit, each two-d low pass filter consists of a Y convolution circuit or integrator 50.1, 50.2 and an X convolution circuit or integrator 52.1, 52.2. Each Y convolution circuit includes M delay lines, each of which is equal in length to the number of pixels in the X direction with the output from each delay line being fed to the input of the next succeeding delay line. This results in the outputs from the delay lines at any given time being the value from a given X pixel value at successive Y positions. These values are averaged with the incoming X pixel value to obtain the desired Y filter value for the pixel.

Each X convolution circuit 52 includes an M bit delay, which M bits, along with the current input, are averaged in the circuit to obtain the desired X direction filtering. For a preferred embodiment, M for both filters is equal to six; however, the M values for the two filters need not be equal.

To simplify the non-linear function circuits, the output from each convolution circuit 52 is connected to a corresponding normalization circuit 54.1, 54.2, which normalization circuit may be considered to be part of the non-linear function circuit in FIG. 3. Normalization circuits 54 operate in known ways to normalize the inputs thereto to values between zero and one.

The output from each normalization circuit 54 is applied as an input to a corresponding non-linear table lookup RAM 56.1, 56.2. This is a standard circuit having an address position for each possible output from normalization circuit 54 and being addressed by the outputs from the normalization circuit. The value stored at each address is the desired non-linear function output corresponding to the address input from the normalization circuit. As previously indicated, for preferred embodiments, the non-linear function for circuit 56.1 would be a softer, less steeply sloped function, while the function for circuit 56.2 would be a steeper non-linear function. The output from circuit 56.2 is connected as one input to modulating mixer 36, the other input to this mixer being from compensation delay 34, which delay performs the function described for this delay in conjunction with FIG. 3. Thus, the processed mask value for each pixel is applied to mixer 36 at the same time the raw value for the pixel on line 30 is applied to the mixer from delay 34. The desired modulated output is thus obtained on line 44.

While a particular circuit has been described above in conjunction with FIGS. 3 and 4 for generating a mask of a blood pool and tissue containing ultrascan image, the invention is not limited to the specific circuit disclosed for generating the mask and other circuits for generating such masks are within the contemplation of the invention. Further, while specific circuits have been suggested for performing the integrating and non-linear functions, other circuits known in the art for performing these functions may also be utilized. Thus, while the invention has been particular shown and described above with reference to a preferred embodiment, the foregoing and other changes in form and detail may be made therein by one skilled in the art while still remaining within the spirit and scope of the invention.

What is claimed is:

1. A circuit for adaptively enhancing a scanned ultrasound image signal for a body portion having areas of tissue and areas of blood pool containing clutter, the circuit comprising:
   means for processing said image signal to generate a binary mask signal having substantially a first value in areas of tissue and having substantially a second different value in areas of blood pool; and
   means for modulating the image signal with the mask signal in a manner so as to substantially pass image signals in the tissue areas and to substantially block image signals in the blood pool areas, whereby clutter is substantially removed from the ultrasound image.

2. A circuit as claimed in claim 1 wherein said image is formed of pixels, and wherein said means for modulating modulates on a pixel-by-pixel basis.

3. A circuit as claimed in claim 2 wherein said means for processing includes at least one low-pass filter stage and a non-linear function circuit at the output of each filter stage.

4. A circuit as claimed in claim 3 wherein each filter stage is a two-d filter stage.

5. A circuit as claimed in claim 4 wherein said image is formed of an X-Y matrix of pixels, and wherein each filter stage includes an X filter stage and a Y filter stage.

6. A circuit as claimed in claim 5 wherein each Y filter stage includes delay means for assuring that filtering is for successive corresponding Y inputs.

7. A circuit as claimed in claim 3 including a normalization circuit at the input to each non-linear function circuit.

8. A circuit as claimed in claim 3 wherein each non-linear function circuit includes a table lookup circuit.

9. A circuit as claimed in claim 3 wherein there are a plurality of filter stages, and wherein the non-linear function utilized in the non-linear function circuit for each succeeding stage is steeper than the function for the preceding stage.

10. A circuit as claimed in claim 2 including means for delaying the image signal applied to said means for modulating by a time equal to the processing time in said means for processing whereby the image signal and mask signal for a given pixel arrive at said means for modulating substantially simultaneously.

11. A method for adaptively enhancing a scanned ultrasound image signal for a body portion having areas of tissue and areas of blood pool containing clutter, the method comprising the steps of:
    processing said image signal to generate a binary mask signal having substantially a first value in areas of tissue and having substantially a second different value in areas of blood pool; and
    modulating the image signal with the mask signal in a manner so as to substantially pass image signals in the tissue areas and to substantially block image signals in the blood pool areas, whereby clutter is substantially removed from the ultrasound image.

12. A method as claimed in claim 11 wherein said image is formed of pixels, and wherein said modulating step modulates on a pixel-by-pixel basis.

13. A method as claimed in claim 12 wherein said processing step includes the steps of filtering said image signal, and operating on the filtered output with a non-linear function.

14. A method as claimed in claim 13 wherein said filtering step and said non-linear function step are performed in succession a plurality of times, and wherein the non-linear function utilized during the non-linear function step for each succeeding execution thereof is steeper than the function for the preceding execution.

* * * * *